(12) United States Patent
Kvist

(10) Patent No.: US 9,802,610 B2
(45) Date of Patent: Oct. 31, 2017

(54) METHOD FOR CONTROLLING THE SPEED OF A VEHICLE

(75) Inventor: Roland Kvist, Braås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 615 days.

(21) Appl. No.: 14/354,508

(22) PCT Filed: Oct. 27, 2011

(86) PCT No.: PCT/SE2011/000189
§ 371 (c)(1),
(2), (4) Date: May 23, 2014

(87) PCT Pub. No.: WO2013/062449
PCT Pub. Date: May 2, 2013

(65) Prior Publication Data
US 2015/0367849 A1    Dec. 24, 2015

(51) Int. Cl.
*B60W 30/14* (2006.01)
*B60K 31/00* (2006.01)
(Continued)

(52) U.S. Cl.
CPC ........... *B60W 30/143* (2013.01); *B60K 31/00* (2013.01); *B60W 30/146* (2013.01);
(Continued)

(58) Field of Classification Search
CPC .. B60W 30/14; B60W 30/143; B60W 30/146; B60W 30/184; B60K 50/10; E02F 9/2079; E02F 9/2253
See application file for complete search history.

(56) References Cited

U.S. PATENT DOCUMENTS 6,056,657 A    5/2000  Garnett
6,470,256 B1 *  10/2002 Cikalo .................. B60K 31/04
                                              123/350
(Continued)

FOREIGN PATENT DOCUMENTS

BE    WO 2010105713 A1 *  9/2010  ............. G01C 21/32
EP          2072365 A2     6/2009
(Continued)

OTHER PUBLICATIONS www.fueleconomy.gov, U.S. Department of Energy, archived: Nov. 28, 2010 [online] [available:https://web.archive.org/web/20101128130210/http://fueleconomy.gov/feg/driveHabits.shtml].*
(Continued)

*Primary Examiner* — Thomas G Black
*Assistant Examiner* — Peter D Nolan
(74) *Attorney, Agent, or Firm* — WRB-IP LLP

(57) ABSTRACT

A method is provided for controlling the speed of a vehicle that includes a drive train for driving the vehicle and a predetermined preferred speed set. The method includes determining whether or not a substantially constant speed of the vehicle is requested, if it is determined that a substantially constant speed is requested, determining whether the requested speed lies within or outside of the predetermined preferred speed set, and if it is determined that the requested speed lies outside of the predetermined speed set, automatically adjusting the speed of the vehicle to a vehicle speed that is within the predetermined speed set.

15 Claims, 5 Drawing Sheets

(51) Int. Cl.
  *E02F 9/20* (2006.01)
  *E02F 9/22* (2006.01)
  *B60W 50/10* (2012.01)
  *B60W 50/00* (2006.01)

(52) U.S. Cl.
  CPC ........... *B60W 50/10* (2013.01); *E02F 9/2079* (2013.01); *E02F 9/2253* (2013.01); *B60K 2310/242* (2013.01); *B60W 2050/0071* (2013.01); *B60W 2720/00* (2013.01)

(56) References Cited

U.S. PATENT DOCUMENTS

| | | | | |
|---|---|---|---|---|
| 8,063,755 | B2* | 11/2011 | Eikelenberg | B60W 50/14 340/439 |
| 9,127,439 | B2* | 9/2015 | Ooi | E02F 9/2246 |
| 9,296,392 | B2* | 3/2016 | Hartmann | B60W 10/02 |
| 2002/0073699 | A1 | 6/2002 | Nishimura et al. | |
| 2003/0220729 | A1 | 11/2003 | Doddek et al. | |
| 2006/0011400 | A1* | 1/2006 | Thomas | E02F 9/2253 180/307 |
| 2006/0271275 | A1* | 11/2006 | Verma | G07C 5/0816 701/532 |
| 2007/0150166 | A1* | 6/2007 | Mino | F02D 31/007 701/110 |
| 2008/0059035 | A1* | 3/2008 | Siddiqui | B60K 6/445 701/93 |
| 2008/0202468 | A1 | 8/2008 | Grill et al. | |
| 2009/0105041 | A1 | 4/2009 | McKenzie et al. | |
| 2010/0056337 | A1* | 3/2010 | Huang | B60K 31/00 477/189 |
| 2011/0130939 | A1* | 6/2011 | Hartmann | B60W 10/02 701/93 |
| 2011/0221586 | A1* | 9/2011 | Eikelenberg | B60W 50/14 340/439 |
| 2011/0276216 | A1* | 11/2011 | Vaughan | B60W 10/06 701/31.4 |
| 2015/0134224 | A1* | 5/2015 | Vaughan | B60W 30/143 701/93 |

FOREIGN PATENT DOCUMENTS

| | | |
|---|---|---|
| EP | 2219092 A1 | 8/2010 |
| WO | 2011126431 A1 | 10/2011 |

OTHER PUBLICATIONS

International Search Report (dated May 30, 2012) for corresponding International Application PCT/SE2011/000189.
International Preliminary Report on Patentability (dated Nov. 6, 2013) for corresponding International Application PCT/SE2011/000189.

* cited by examiner

METHOD FOR CONTROLLING THE SPEED OF A VEHICLE

BACKGROUND AND SUMMARY

The present disclosure relates to a method for controlling the speed of a vehicle.

Various types of vehicles of today include a drive train for driving the vehicle and a speed control arrangement for controlling the speed of the vehicle. As such, when an operator of the vehicle requests a certain speed, for instance by actuating the accelerator pedal (or gas pedal), the speed control arrangement communicates with the drive train such that the drive train operates in a working condition in which the requested speed is obtained.

However, there is a risk that the requested speed is not preferred for the vehicle. Purely by way of example, the requested speed may result in that the drive train operates in a working condition that has inappropriately high power losses in for instance a power supply and/or a transmission arrangement of the drive train. As another example, the requested speed may result in an undesired wear of components of the vehicle. In a further example, the requested speed may result in inappropriate vibrations of, and/or noise from, at least some components of the vehicle.

In an attempt to solve the above problems, U.S. Pat. No. 7,789,795 proposes that the engine speed of a power supply is selected so as to correspond to an optimum power supply efficiency and that the ratio of automatic transmission arrangement is selected so as to correspond to a requested power demand.

However, although the '795 method may result in some operating conditions of the drive line in which the power losses of the drive train are relatively low, the '795 method may also result in operating conditions in which the power losses are relative large. An example of an operating condition wherein the power losses in the drive line are above a preferred value may be when the selected engine speed and the requested velocity of the vehicle result in a ratio of the automatic transmission arrangement which ratio is associated with relatively large power losses.

In view of the above, it is desirable to obtain a vehicle control method wherein a drive line of the vehicle, at least during some steady state operating conditions, is operated such that preferred operating conditions are obtained.

As such, the present disclosure relates according to an aspect thereof to a method for controlling the speed of a vehicle. The vehicle comprises a drive train for driving the vehicle and the vehicle also comprises a predetermined preferred speed set. The method comprises:
  determining whether or not a substantially constant speed of the vehicle is requested;
  if it is determined that a substantially constant speed is requested, determining whether the requested speed lies within or outside of the predetermined preferred speed set, and
  if it is determined that the requested speed lies outside of the predetermined speed set, automatically adjusting the speed of the vehicle to a vehicle speed that is within the predetermined speed set.

A method according to the above implies that the vehicle will obtain a substantially constant speed that lies within the predetermined preferred speed set and this in turn implies that the vehicle will be operated in a preferred operating condition when travelling at a substantially constant speed.

As used herein, the expression "speed set" relates to at least one speed. However, it should be noted that the expression "speed set" may include a plurality of individual speeds. Moreover, in addition to, or instead of, comprising at least one speed, the speed set may comprise one or more speed ranges. As such, the expression "speed set" encompasses any combination of at least one speed and/or at least one speed range.

Optionally, a power loss of the drive train is equal to or below a predetermined power loss within the predetermined preferred speed set.

Optionally, the predetermined preferred speed set comprises a range of preferred speeds, preferably the predetermined preferred speed set comprises a plurality of ranges of preferred speeds.

Optionally, the drive train comprises a power supply and an automatic transmission arrangement which comprises a power split assembly which in turn comprises a step ratio power flow path and a infinitely variable ratio power flow path, at least one value in the predetermined preferred speed set corresponding to at least one condition of the transmission arrangement in which at least a predetermined portion of the power flows through the step ratio power flow path.

Optionally, the predetermined portion of the power flow through the step ratio power flow path is at least 80%, preferably at least 90%, of the power flow through the power split assembly.

Optionally, the vehicle comprises a plurality of predetermined preferred speed sets, the method further comprising:
  determining whether the vehicle speed control system requested an acceleration or a deceleration of the vehicle prior to the substantially constant speed request.

Optionally, if an acceleration of the vehicle was requested prior to the substantially constant speed request and if it is determined that the requested speed lies outside the predetermined preferred speed set:
  increasing the speed of the vehicle until it reaches a speed within the preferred speed set.

Optionally, if a deceleration of the vehicle was requested prior to the substantially constant speed request and if it is determined that the requested speed lies outside of the predetermined preferred speed set:
  decreasing the speed of the vehicle until it reaches a speed within the preferred speed set.

Optionally, the vehicle further comprises a driveline characteristics value input means, the method further comprising:
  determining the driveline characteristics value from the driveline characteristics value input means, and
  electing the range of preferred speeds in accordance with the driveline characteristics value.

Optionally, the vehicle further comprises a manual speed control means, the method further comprising:
  determining whether or not a substantially constant speed of the vehicle is requested by the manual speed control means.

Optionally, the vehicle further comprises an automatic speed control means, wherein the step of automatically adjusting the speed of the vehicle comprises a step of operating the automatic speed control means in order to modify the speed of the vehicle.

A second aspect of the present disclosure relates to a computer program product comprising a computer program containing computer program code executable in a computer or a processor to implement the steps of a method according to any of the preceding claims, the product being stored on a computer-readable medium or a carrier wave.

A third aspect of the present disclosure relates to an electronic control unit comprising a computer program product according to the second aspect of the present disclosure and arranged to execute a method for controlling the speed of a vehicle according to the first aspect of the present disclosure.

A fourth aspect of the present disclosure relates to a vehicle comprising a drive train adapted to drive the vehicle, the drive train comprising a power supply and a transmission arrangement. The vehicle comprises an electronic control unit according to the third aspect of the present invention.

Optionally, the vehicle further comprises the driveline characteristics value input means.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
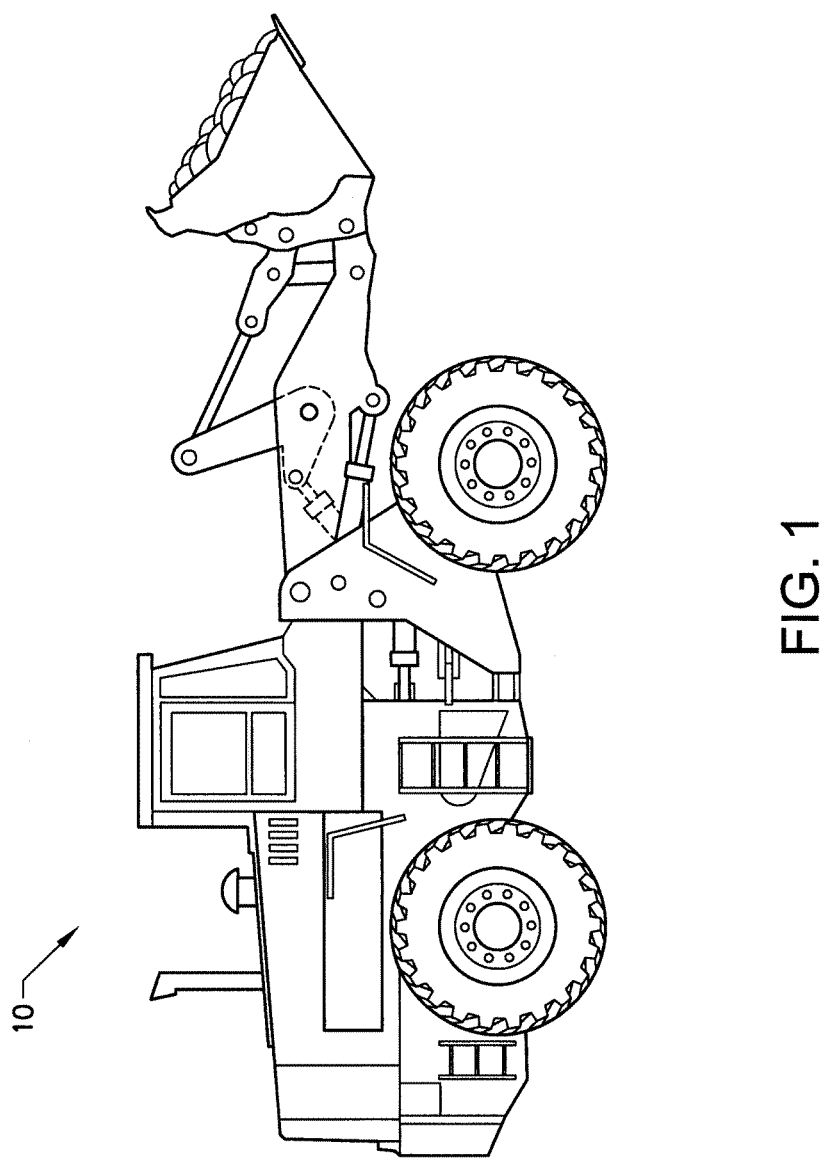
FIG. 1 illustrates a vehicle.

The invention will below be described for a vehicle in the form of a wheel loader 10 such as the one illustrated in FIG. 1. The wheel loader 10 should be seen as an example of a vehicle in which the speed control method of the present invention may be implemented. However, the speed control method of the present invention may be implemented in a plurality of different types of vehicles. Purely by way of example, the speed control method could be implemented in a truck, a lorry, a tractor, a car, a bus or any type of work machine.

Figure 2:
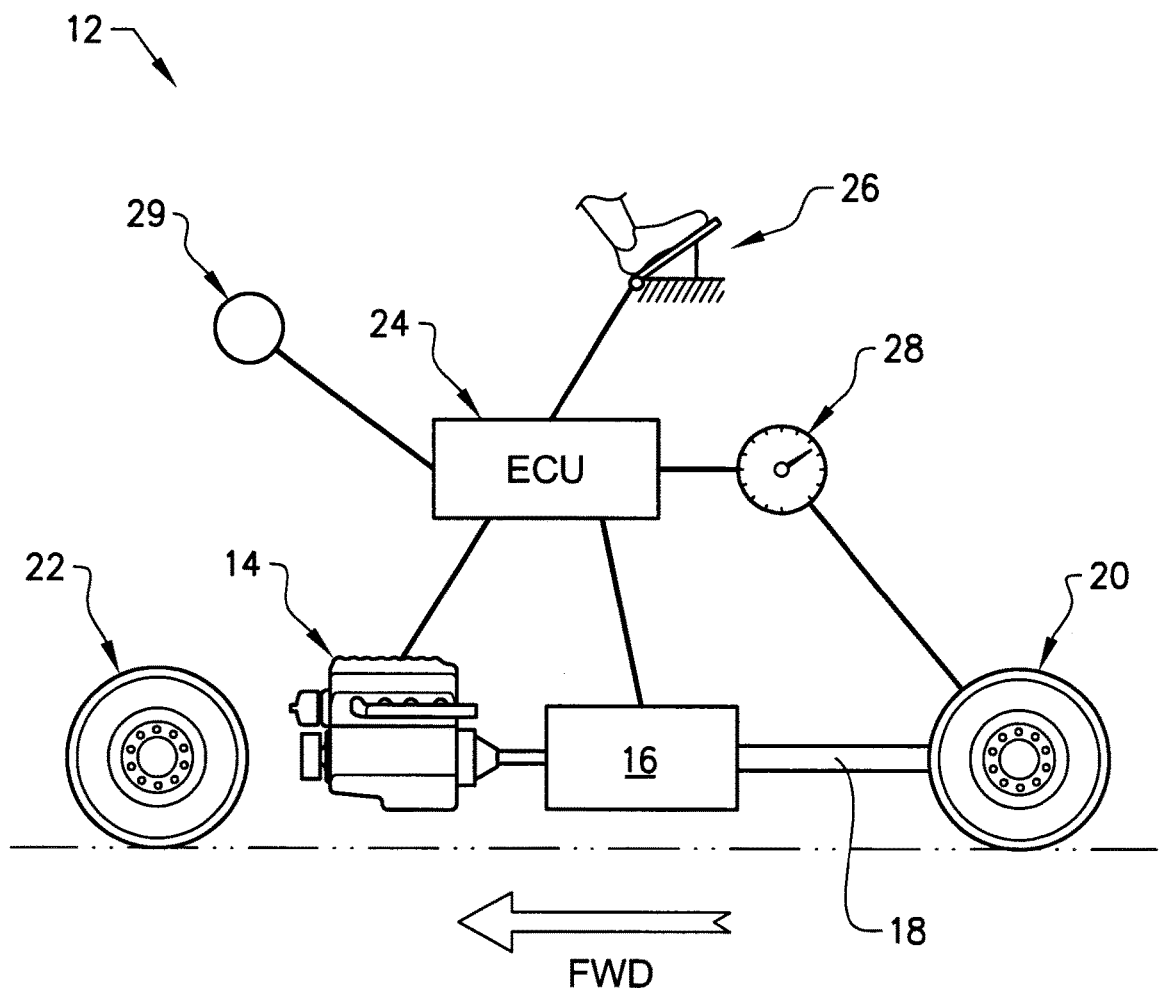
FIG. 2 illustrates a drive train for a vehicle.

FIG. 2 schematically illustrates a drive train 12 of a vehicle. As may be gleaned from FIG. 2, the drive train 12 comprises a power supply 14. Purely by way of example, the power supply 14 may be an internal combustion engine, such as a diesel engine or a gasoline engine, or an electric motor. As another example, the power supply 14 may be a so called hybrid engine comprising an internal combustion engine as well as an electric motor (not shown).

The FIG. 2 drive train 12 may further comprise a transmission arrangement 16. Purely by way of example, the transmission arrangement may be a manual transmission arrangement and/or an automatic transmission arrangement. It should also be noted that in implementations of the drive train 12, for instance when the power supply 14 is an electric motor, the transmission arrangement may be omitted.

The drive train 12 may further comprise a drive shaft 18 adapted to connect the power supply 14, possibly via a transmission arrangement 16, to one or more wheels of the drive train 12. In the FIG. 2 implementation, the drive shaft 18 connects the transmission arrangement 16 to the back wheels 20 of the drive train 12. However, in other implementations of the drive train 12, the drive shaft 18 may instead, or in addition, connect the transmission arrangement 16 to the forward wheels 22.

The drive train 12 preferably also comprises an ECU (electronic control unit) 24 and a speed request means, or speed requester, 26 for requesting a desired speed of the vehicle 10 hosting the FIG. 2 drive train 12. The speed request means 26 may for instance comprise a manually operated actuator, such as an accelerator pedal or a gas pedal.

In other implementations of the drive train 12, the speed request means 26 may be operated automatically. For instance, the speed request means 26 may be operated so as to follow a target object (such as a target vehicle) or the speed request means 26 may be implemented to request a speed of the vehicle in accordance with a predetermined schedule.

As another example, the speed request means 26 may comprise means for receiving information as regards a required speed and to transmit such a request to selected components of the drive train 12. Purely by way of example, the speed request means 26 may be adapted to receive information that is transmitted via a carrier wave and/or one or more cables (not shown in FIG. 2).

In the FIG. 2 implementation of the drive train 12, the speed request means 26 is in communication with the ECU 24 which in turn is in communication to the power supply 14 and/or the transmission arrangement 16. However, in other implementations of the drive train 12, the speed request means 26 may be directly or indirectly in communication with the power supply 14 and/or the transmission arrangement 16 without communicating with the ECU 24.

FIG. 2 further illustrates that the vehicle 10 may comprise a speedometer 28 adapted to determine the speed of the vehicle 10. Purely by way of example, the speedometer 28 may be adapted to measure the rotational speed of a least one wheel 20, 22 of the vehicle 10. However, in other implementations, the speedometer 28 may be adapted to determine the speed of the vehicle by using other means, such as a GPS system or the like.

Figure 3:
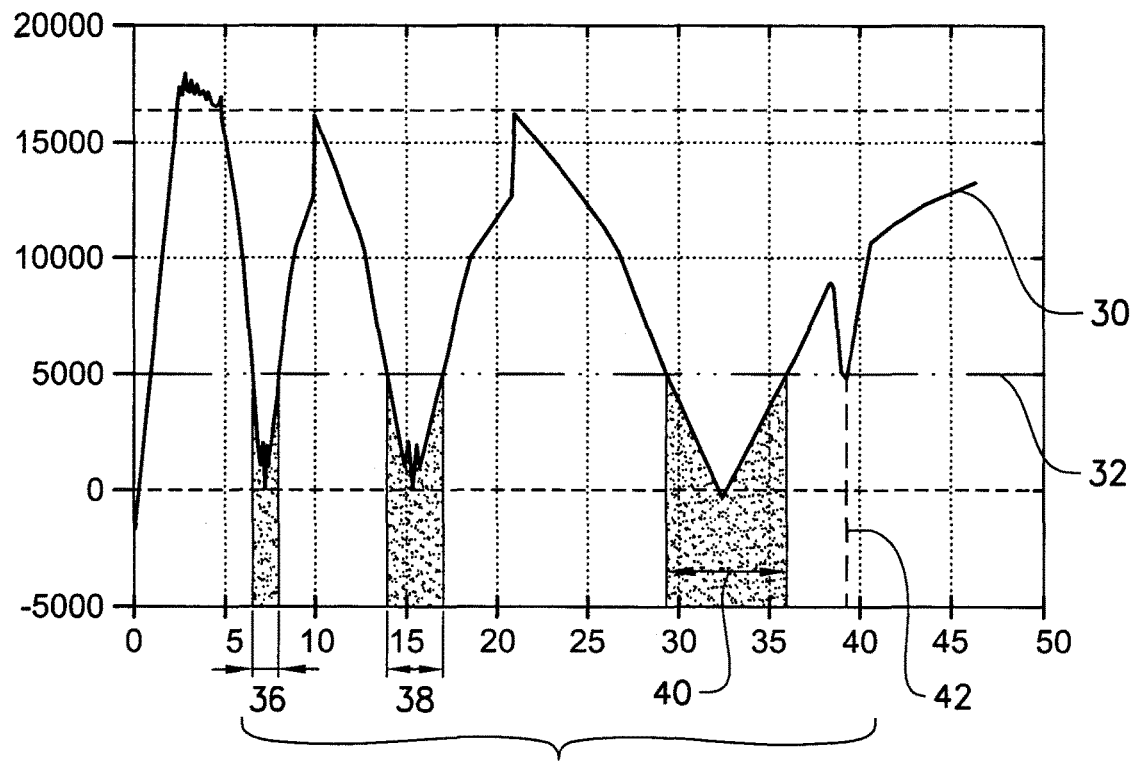
FIG. 3 illustrates a diagram of a characteristics of a vehicle as a function of the speed of the vehicle.

FIG. 3 is a diagram of a vehicle characteristics value as a function of the speed of the vehicle. The vehicle characteristics value is indicative of a characteristic of the vehicle. Purely by way of example, the vehicle characteristics value may be indicative of the wear of one or more components of the vehicle. As another non-limiting example, the vehicle characteristics value may be related to the amount of vibrations in one or more components of the vehicle. As a further non-limiting example, the vehicle characteristics value may be indicative of the noise level within and/or outside of the vehicle 10.

In the below examples, the vehicle characteristics value is indicative of the power loss of the drive train 12. However, it should be noted that the below description is equally applicable for any other type of vehicle characteristics value.

FIG. 3 illustrates that a vehicle characteristics value 30, which in the present example is indicative of the power loss of the drive train 12, varies with the speed of the vehicle 10. In FIG. 3 a low value of the vehicle characteristics value is indicative of low losses of the drive train 12. As such, a low vehicle characteristics value is generally desired. However, in other implementations, a high vehicle characteristics value may be indicative of a beneficial operating condition of the drive train 12 and/or the vehicle 10.

Figure 8:
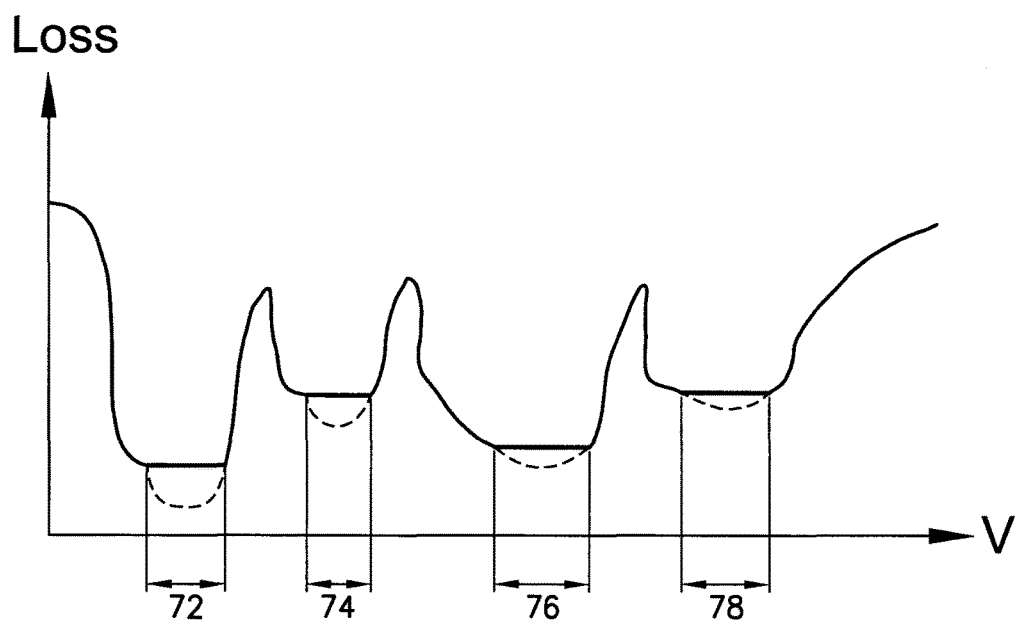
FIG. 8 illustrates a diagram of a power loss of a vehicle as a function of the speed of the vehicle.

FIG. 3 further illustrates that for certain speeds, the vehicle characteristics value 30 is below a threshold value 32. The threshold value 32 may be indicative of a largest preferred power loss of the drive train 12 and/or the vehicle 10 such that power losses below the threshold value 32 may be acceptable and/or preferred. As such, in FIG. 3, a predetermined preferred speed set 34 may be established that comprises three speed ranges 36, 38 and 40 as well as a single speed value 42. However, it should be noted that speed ranges and/or individual values of a speed in a predetermined preferred speed set need not necessarily be determined by using a constant threshold value 32. Quite the contrary, in other embodiments of the present invention, different threshold values may be used for different velocities (see e.g. FIG. 8 illustrating four speed ranges 72, 74, 76, 78 associated with different threshold values).

Once a predetermined preferred speed set 34 has been established for a vehicle 10, the speed set 34 is preferably stored in a readable medium that is accessible to the vehicle 10. Purely by way of example, the predetermined preferred speed set 34 may be stored in the ECU 24 of the vehicle 10.

Figure 4:
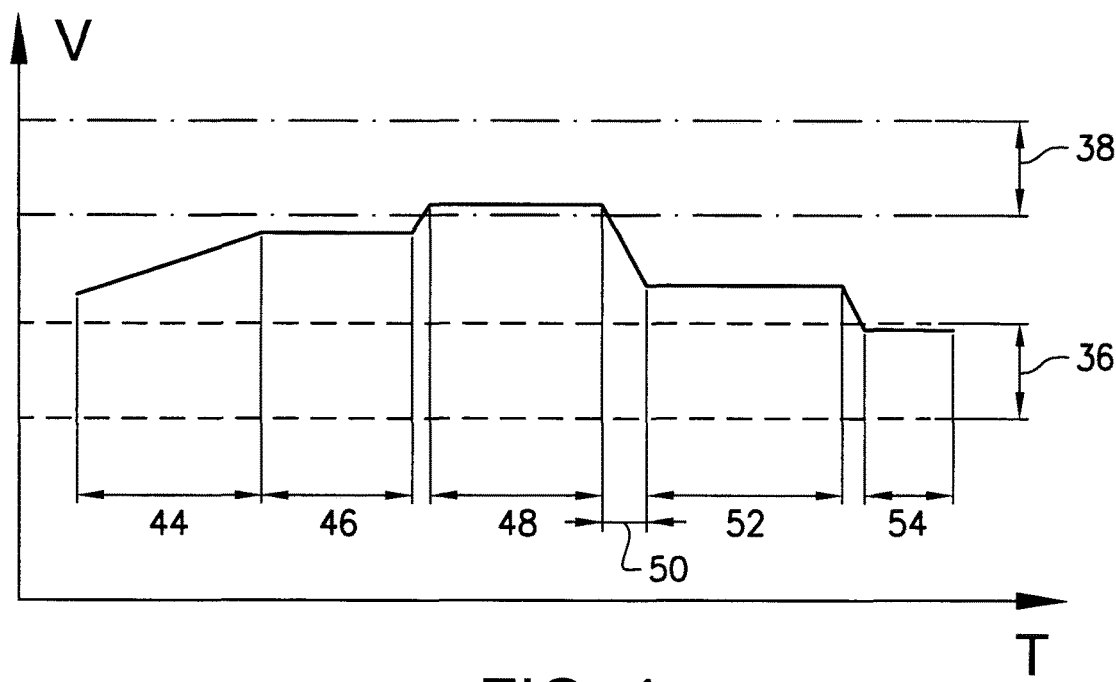
FIG. 4 illustrates a diagram of the velocity of a vehicle as a function of time.

FIG. 4 is a diagram of the speed V of a vehicle 10 as a function of time T. FIG. 4 further illustrates two of the speed ranges 36, 38 of the speed set 34 illustrated in FIG. 3. FIG. 4 further illustrates a first time interval 44 during which an increase of the speed V of the vehicle 10 is requested. During a second time interval 46, the speed controlling method of the present invention determines that a substantially constant speed of the vehicle 10 is requested.

The step of determining whether or not a substantially constant speed of the vehicle 10 is requested may be implemented in a plurality of ways. Purely by way of example, the step may be implemented by determining, either constantly or at certain time instants, whether or not the difference between a maximum speed and a minimum speed of the vehicle 10 during an elapsed time exceeds a predetermined speed difference threshold. The speed difference threshold may for instance be an absolute value, e.g. expressed in km/h, or a relative value, e.g. expressed in a ratio of the average velocity of the vehicle 10.

As an example of the above implementation, the step of determining whether or not a substantially constant speed of the vehicle 10 is requested may be determined by constantly, or at certain time instants, establishing whether or not the maximum speed difference exceeds 5 km/h (optionally, exceeds 5% of the average speed) for the last five seconds. If the maximum speed difference does not exceed the predetermined speed difference threshold during the elapsed time, the above implementation constant speed determination step establishes that a substantially constant speed is requested.

As another option to implement the step of determining whether or not a substantially constant speed of the vehicle 10 is requested, a measure indicative of the variance of the speed of the vehicle during a predetermined time is determined constantly or at certain time instants. If the above measure indicative of the speed variance is below a predetermined threshold value, the above implementation of the constant speed determination step establishes that a substantially constant speed is requested.

It should be noted that the step of determining whether or not a substantially constant speed of the vehicle 10 is requested may be implemented in other ways in other embodiments of the speed control method of the present invention.

Regardless of how it has been determined that a substantially constant speed is requested, the control method of the present invention then determines whether the requested speed lies within or outside of the predetermined preferred speed set 34. In embodiments of the inventive method, an average speed during a certain elapsed time may be used as a measure of the requested speed.

As may be gleaned from FIG. 4, the requested, and substantially constant, speed during the second time interval 46 is above the first speed range 36 and below the second speed range 38. As such, the control method of the present invention determines that the requested speed lies outside of the predetermined preferred speed set 34.

The speed control method of the present invention subsequently automatically adjusts the speed of the vehicle 10 to a vehicle speed that is within the predetermined speed set 34. Such an automatic adjustment may preferably be performed by the ECU 24, see FIG. 2. As such, during a third time interval 48 in FIG. 4, the speed of the vehicle 10 has been increased to the lowermost speed of the second speed range 38.

If the substantially constant speed requested is located between two subsets (each subset comprising a individual speed and/or a speed range) of the predetermined speed set 34, the speed control method preferably comprises a step for selecting to which one of the two subsets the velocity of the vehicle 10 should be adjusted.

The above selection may be implemented in a plurality of ways. Purely by way of example, the selection may be implemented such that the vehicle's 10 speed is adjusted such that the adjusted speed of the vehicle is the speed within the said predetermined speed set which is closest to the substantially constant requested speed.

As another non-limiting example, the above selection may be implemented such that the vehicle's speed is reduced until the vehicle's speed is within said predetermined speed set.

As a further non-limiting example, the above selection may be implemented such that the vehicle's speed is increased until the vehicle's speed is within said predetermined speed set.

However, the time intervals 44, 46, 48 of FIG. 4 illustrate a preferred implementation of the above selection. As has previously been discussed, the speed control method of the present invention has determined that a substantially constant speed is requested during the second time interval 46. Once it has been established that a substantially constant speed is requested, the preferred implementation of the above selection determines whether an acceleration or a deceleration of the vehicle was requested prior to the substantially constant speed request.

In the example illustrated in FIG. 4, an acceleration of the vehicle 10 was requested during the first time interval 44. The preferred implementation of the selection increases the speed of the vehicle 10 until it reaches a speed within the preferred speed set. In the example illustrated in FIG. 4, the speed is increased until it reaches the second speed range 38.

If the preferred implementation of the above selection instead determines that a deceleration of the vehicle 10 was requested prior to the substantially constant speed request, the preferred implementation instead decreases the speed of the vehicle 10 until it reaches a speed within the preferred speed set.

The above scenario is illustrated in the fourth 50, fifth 52 and sixth 54 time intervals in FIG. 4. A substantially constant speed is requested during the fifth time interval 54 and a deceleration of the vehicle 10 was requested during the fourth time interval 50. Thus, the preferred implementation of the selection reduces the speed of the vehicle at the fifth time interval 52 until it reaches the highest speed of the first speed range 36.

In an embodiment of the speed control method of the present invention, a driveline characteristics value is selected. Purely by way of example, a driveline characteristics value may be selected by actuating a driveline characteristics value input means, or a driveline characteristics value inputter, such as a driveline characteristics value actuator, of a vehicle 10. An example of a driveline characteristics value input means 29 is illustrated in FIG. 2. As may be gleaned from FIG. 2, the driveline characteristics value input means 29 may preferably be in communication with the ECU 24.

The driveline characteristics set may be a continuous or discrete range of data indicative of to what extent the driver and/or operator of the vehicle 10 may select a constant speed for the vehicle. Purely by way of example, the driveline characteristics set may comprise the values I, II and III or the states Sport, Regular and Economy.

Figure 5:
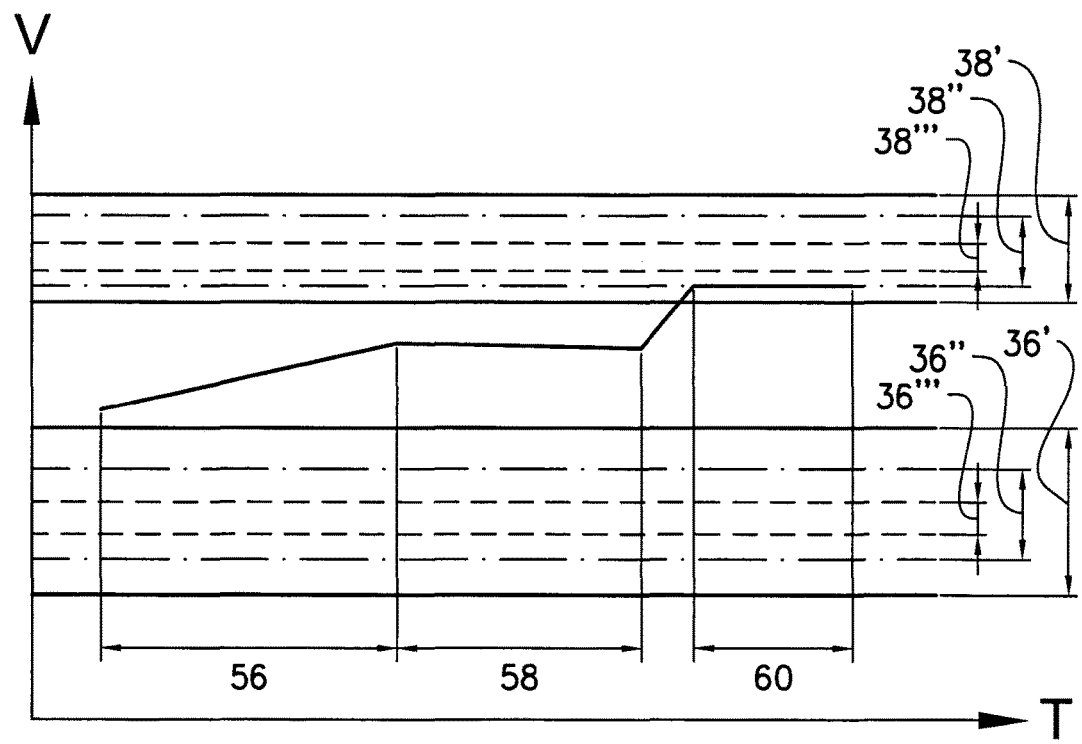
FIG. 5 illustrates another diagram of the velocity of a vehicle as a function of time.

Each one of the above values of the driveline characteristics set may be associated with a corresponding predetermined speed set. An example of three different predetermined speed set is illustrated in FIG. 5. In FIG. 5, the speed set comprising the widest first and second speed ranges 36', 38' corresponds to the Sport state (or state I), the speed set comprising the first and second speed ranges 36", 38" of average width corresponds to the Regular state (or state II) and the narrowest first and second speed ranges 36''', 38''' corresponds to the Economy state (or state III).

As may be gleaned from FIG. 5, the Sport state (or state I) allows a driver or operator of the vehicle to select a constant speed of the vehicle which speed is within relatively wide speed ranges. The wide speed ranges will result in a relatively high degree of freedom for the driver/operator but may also imply that the vehicle may be driven at a speed which is not necessarily close to the optimum vehicle speed, at least from the vehicle characteristics value point of view.

On the other hand, the Economy state (or state III) with relatively narrow speed ranges implies that an appropriate value, at least from the vehicle characteristics value point of view, of the constant speed may be selected. However, the narrow speed ranges of the Economy state (or state III) imply that the driver/operator of the vehicle will experience a limited degree of freedom when operating the vehicle 10.

The Regular state (or state II) is a compromise between state I and state III.

Other embodiments of the speed control method of the present invention may of course include more or fewer discrete values than what has been discussed hereinabove.

Furthermore, in embodiments of the speed control method comprising a driveline characteristics which in turn comprises a continuous data range, the width of the speed ranges may be continuously adjusted in relation to a selected value within the continuous data range.

In FIG. 5, illustrating an embodiment comprising a driveline characteristics set with three values I, II and III (or Sport, Regular and Economy states), the Regular state has been selected. During a first time interval 56 in FIG. 5, an acceleration of the vehicle 10 is requested and during a second time interval 58, a substantially constant speed is requested. The speed control method then automatically increases the speed of the vehicle 10 until the speed reaches the second speed range 38" associated with the Regular state, see the third time interval 60 in FIG. 5.

As has been intimated hereinabove, the vehicle characteristics value may be indicative of a power loss of the drive train 12.

Figure 6:
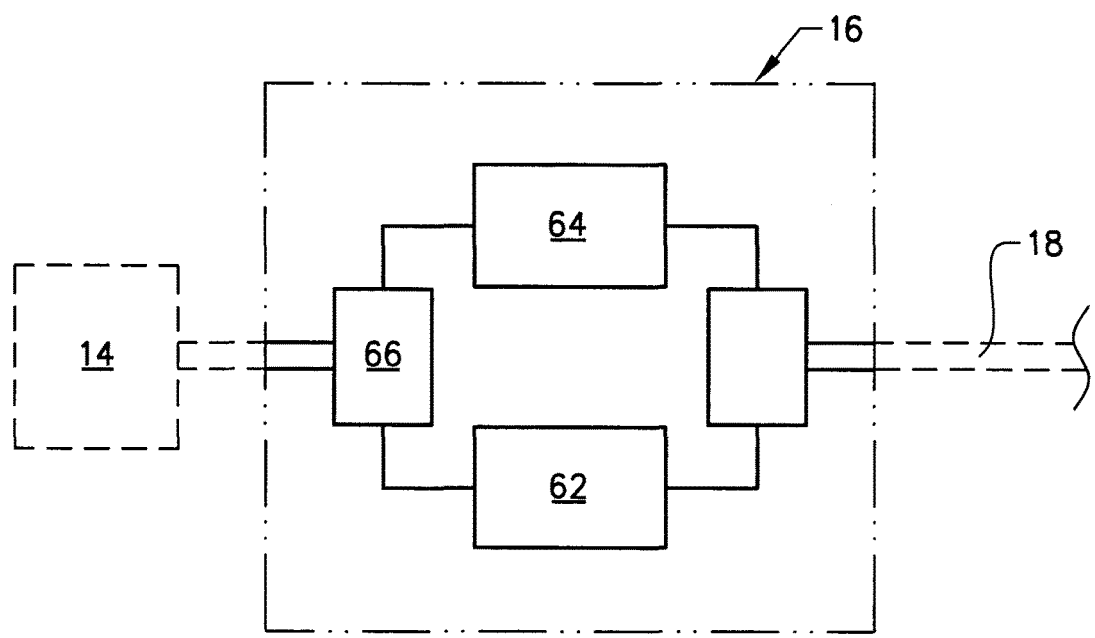
FIG. 6 schematically illustrates a transmission arrangement of a vehicle.

FIG. 6 illustrates an embodiment of a drive train 12 comprising a power supply 14 and a transmission arrangement 16. The FIG. 6 transmission arrangement 16 comprises a power split assembly. The power split assembly comprises a step ratio power flow path 62 and an infinitely variable ratio power flow path 64. The step ratio power flow path 62 is adapted to provide at least one, but preferably a plurality of, fixed gear ratio whereas the infinitely variable ratio power flow path 64 is adapted to provide a continuous gear ratio.

Purely by way of example, the step ratio power flow path 62 may comprise a plurality of gear wheels. The step ratio power flow path 62 may further comprise means, e.g. a selector, for selecting which ones of two or more wheels that should be arranged to mesh in order to obtain a required fixed gear ratio.

Moreover, and again purely by way of example, the infinitely variable ratio power flow path 64 may comprise a hydraulic transmission and/or a belt-driven conical-pulley transmission.

As such, the step ratio power flow path 62 and the infinitely variable ratio power flow path 64 may be operated so that the together provide a desired gear ratio. To this end, the transmission arrangement 16 preferably comprises a torque split arrangement 66 adapted to selectively distribute a torque provided from the power supply 14 to the step ratio power flow path 62 and the infinitely variable ratio power flow path 64, respectively.

Traditionally, the infinitely variable ratio power flow path 64 is generally associated with larger power losses than the step ratio power flow path 62. As such, a preferred embodiment of the speed control method of the present invention may include that at least one value in the predetermined preferred speed set corresponds to at least one condition of the transmission arrangement 16 in which at least a predetermined portion of the power flows through the step ratio power flow path 62. As used herein, the expression "portion of the power" is intended to relate to the power transmitted to the step ratio power flow path 62 divided by the power delivered from the power supply 14 to the transmission arrangement 16.

Preferably, the predetermined portion of the power flow through the step ratio power flow path 62 is at least 80%, preferably at least 90%, of the power flow through the power split assembly.

Figure 7:
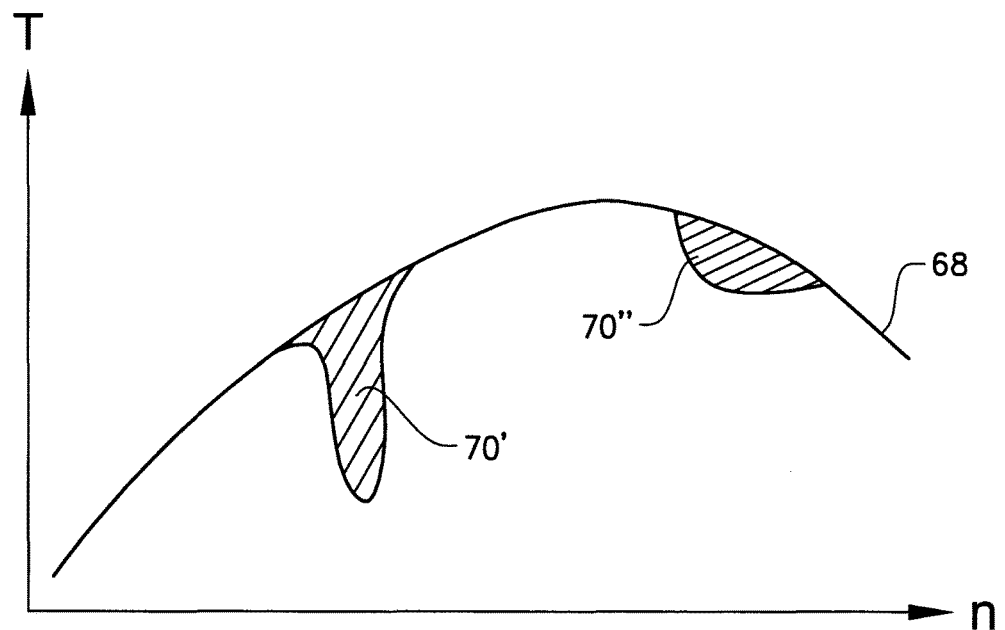
FIG. 7 illustrates a torque curve of an internal combustion engine.

The above preferred conditions of the transmission arrangement 16 may preferably be combined with preferred operating conditions of the power supply 14 in order to obtain at least a portion of a preferred speed set. To this end, reference is made to FIG. 7 illustrating a torque curve 68 of a power supply 14 which in the FIG. 7 example is an internal combustion engine. At least one torque area 70' below the torque curve 68 is determined, theoretically and/or by testing, to be associated with appropriately low losses in, i.e. with appropriately high efficiency of, the power supply 14.

As may be gleaned from FIG. 7, the torque area 70' is associated with a certain engine speed range and/or a certain torque range. The ranges thus determined may subsequently be combined with the preferred condition or conditions of the transmission arrangement 16 which have been discussed hereinabove in order to arrive at a predetermined preferred speed set.

In the implementation illustrated in FIG. 7, two preferred torque areas 70', 70" are determined each one of which being associated with an appropriately high efficiency of the power supply 14. It should be noted that the actual efficiency of the different torque areas need not be the same. Moreover, in other implementations of the above step of determining a preferred engine speed range, one, two, three or more preferred torque areas (not shown in FIG. 7) may be determined for a power supply 14.

Instead of or in addition to, the above combination of preferred condition or conditions of the transmission arrangement 16 and preferred engine speeds and/or torques, a predetermined preferred speed set may be determined, theoretically and/or by testing, by determining the power loss of the assembly of the power supply 14 and the transmission arrangement 16. FIG. 8 illustrates the power loss of the above assembly as a function of the velocity of a vehicle hosting the assembly. FIG. 8 also illustrates that certain speed ranges have been identified which correspond to velocities that are equal to or below preferred power losses. FIG. 8 further illustrates that the magnitude of the preferred power loss may vary with the speed of the vehicle 10.

It is to be understood that the present invention is not limited to the embodiments described above and illustrated in the drawings. As such, the skilled person will recognize that many changes and modifications may be made within the scope of the appended claims.

The invention claimed is:

1. A method for controlling the speed of a vehicle, the vehicle comprising a drive train for driving the vehicle, the vehicle comprising a predetermined preferred speed set, the method comprising:
    determining whether or not a substantially constant speed of the vehicle is requested;
    if it is determined that a substantially constant speed is requested, determining whether the requested speed lies within or outside of the predetermined preferred speed set, wherein the predetermined speed set is established based on at least one vehicle characteristics value indicative of at least one of: wear of one or more components of the vehicle, an amount of vibrations in one or more components of the vehicle, a noise level within and/or outside of the vehicle and a power loss of the drive train of the vehicle, and
    if it is determined that the requested speed lies outside of the predetermined speed set, automatically adjusting the speed of the vehicle to a substantially constant vehicle speed that is within the predetermined speed set.

2. The method according to claim 1, wherein the power loss of the drive train is equal to or below a predetermined power loss within the predetermined preferred speed set.

3. The method according to claim 2, wherein the vehicle further comprises a driveline characteristics value input means, the method further comprising:
    determining the driveline characteristics value from the driveline characteristics value input means, and
    selecting the range of preferred speeds in accordance with the driveline characteristics value.

4. The method according to claim 1, wherein the predetermined preferred speed set comprises a range of preferred speeds.

5. The method according to claim 1, wherein the vehicle comprises a plurality of predetermined preferred speed sets, the method further comprising:
    determining whether the vehicle speed control system requested an acceleration or a deceleration of the vehicle prior to the substantially constant speed request.

6. The method according to claim 1, wherein the vehicle further comprises a manual speed controller, the method further comprising:
    determining whether or not a substantially constant speed of the vehicle is requested by the manual speed controller.

7. The method according to claim 1, wherein the vehicle further comprises an automatic speed controller, wherein the step of automatically adjusting the speed of the vehicle comprises a step of operating the automatic speed controller in order to modify the speed of the vehicle.

8. A method for controlling the speed of a vehicle, the vehicle comprising a drive train for driving the vehicle, the vehicle comprising a predetermined preferred speed set, the method comprising:
    determining whether or not a substantially constant speed of the vehicle is requested;
    if it is determined that a substantially constant speed is requested, determining whether the requested speed lies within or outside of the predetermined preferred speed set, and
    if it is determined that the requested speed lies outside of the predetermined speed set, automatically adjusting the speed of the vehicle to a substantially constant vehicle speed that is within the predetermined speed set,
    wherein the drive train comprises a power supply and an automatic transmission arrangement which comprises a power split assembly which in turn comprises a step ratio power flow path and a infinitely variable ratio power flow path, at least one value in the predetermined preferred speed set corresponding to at least one condition of the transmission arrangement in which at least a predetermined portion of the power flows through the step ratio power flow path.

9. The method according to claim 8, wherein the predetermined portion of the power flow through the step ratio power flow path is at least 80% of the power flow through the power split assembly.

10. A method for controlling the speed of a vehicle, the vehicle comprising a drive train for driving the vehicle, the vehicle comprising a predetermined preferred speed set, the method comprising:
    determining whether or not a substantially constant speed of the vehicle is requested;
    if it is determined that a substantially constant speed is requested, determining whether the requested speed lies within or outside of the predetermined preferred speed set, and
    if it is determined that the requested speed lies outside of the predetermined speed set, automatically adjusting the speed of the vehicle to a substantially constant vehicle speed that is within the predetermined speed set,
    wherein the vehicle comprises a plurality of predetermined preferred speed sets, the method further comprising:
    determining whether the vehicle speed control system requested an acceleration or a deceleration of the vehicle prior to the substantially constant speed request, wherein, if an acceleration of the vehicle was requested prior to the substantially constant speed request and if it is determined that the requested speed lies outside the predetermined preferred speed set:

increasing the speed of the vehicle until it reaches a speed within the preferred speed set.

11. A method for controlling the speed of a vehicle, the vehicle comprising a drive train for driving the vehicle, the vehicle comprising a predetermined preferred speed set, the method comprising:

determining whether or not a substantially constant speed of the vehicle is requested;

if it is determined that a substantially constant speed is requested, determining whether the requested speed lies within or outside of the predetermined preferred speed set, and if it is determined that the requested speed lies outside of the predetermined speed set, automatically adjusting the speed of the vehicle to a substantially constant vehicle speed that is within the predetermined speed set, wherein the vehicle comprises a plurality of predetermined preferred speed sets, the method further comprising:

determining whether the vehicle speed control system requested an acceleration or a deceleration of the vehicle prior to the substantially constant speed request, wherein, if a deceleration of the vehicle was requested prior to the substantially constant speed request and if it is determined that the requested speed lies outside of the predetermined preferred speed set:

decreasing the speed of the vehicle until it reaches a speed within the preferred speed set.

12. Computer program product, comprising a computer program containing computer program code executable in a computer or a processor to implement the steps of a method according to claim 1, the product being stored on a non-transitory computer-readable medium.

13. Electronic control unit, comprising a computer program product arranged to execute a method for controlling the speed of a vehicle, the vehicle comprising a drive train for driving the vehicle, the vehicle comprising a predetermined preferred speed set, the method comprising:

determining whether or not a substantially constant speed of the vehicle is requested;

if it is determined that a substantially constant speed is requested, determining whether the requested speed lies within or outside of the predetermined preferred speed set, wherein the predetermined speed set is established based on at least one vehicle characteristics value indicative of at least one of: wear of one or more components of the vehicle, an amount of vibrations in one or more components of the vehicle, a noise level within and/or outside of the vehicle and a power loss of the drive train of the vehicle, and if it is determined that the requested speed lies outside of the predetermined speed set, automatically adjusting the speed of the vehicle to a substantially constant vehicle speed that is within the predetermined speed set.

14. A vehicle, comprising a drive train adapted to drive the vehicle, the drive train comprising a power supply and a transmission arrangement, the vehicle comprising an electronic control unit comprising a computer program product arranged to execute a method for controlling the speed of a vehicle, the vehicle comprising a drive train for driving the vehicle, the vehicle comprising a predetermined preferred speed set, the method comprising:

determining whether or not a substantially constant speed of the vehicle is requested;

if it is determined that a substantially constant speed is requested, determining whether the requested speed lies within or outside of the predetermined preferred speed set, wherein the predetermined speed set is established based on at least one vehicle characteristics value indicative of at least one of: wear of one or more components of the vehicle, an amount of vibrations in one or more components of the vehicle, a noise level within and/or outside of the vehicle and a power loss of the drive train of the vehicle, and if it is determined that the requested speed lies outside of the predetermined speed set, automatically adjusting the speed of the vehicle to a substantially constant vehicle speed that is within the predetermined speed, set.

15. A vehicle, comprising a drive train adapted to drive the vehicle, the drive train comprising a power supply and a transmission arrangement, the vehicle comprising an electronic control unit comprising a computer program product arranged to execute a method for controlling the speed of a vehicle, the vehicle comprising a drive train for driving the vehicle, the vehicle comprising a predetermined preferred speed set, the method comprising:

determining whether or not a substantially constant speed of the vehicle is requested;

if it is determined that a substantially constant speed is requested, determining whether the requested speed lies within or outside of the predetermined preferred speed set, and if it is determined that the requested speed lies outside of the predetermined speed set, automatically adjusting the speed of the vehicle to a substantially constant vehicle speed that is within the predetermined speed set, wherein a power loss of the drive train is equal to or below a predetermined power loss within the predetermined preferred speed set, wherein the vehicle further comprises a driveline characteristics value input means, the method further comprising:

determining the driveline characteristics value from the driveline characteristics value input means, and selecting the range of preferred speeds in accordance with the driveline characteristics value.

* * * * *